(12) United States Patent
Irazabal et al.

(10) Patent No.: US 11,574,268 B2
(45) Date of Patent: Feb. 7, 2023

(54) BLOCKCHAIN ENABLED CROWDSOURCING

(71) Applicant: INTERNATIONAL BUSINESS MACHINES CORPORATION, Armonk, NY (US)

(72) Inventors: Jeronimo Irazabal, Roque Pérez (AR); Raul O. Laprida, Capital Federal (AR); Diego A. Masini, La Plata (AR); Dulce B. Ponceleon, Palo Alto, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 230 days.

(21) Appl. No.: 15/789,635

(22) Filed: Oct. 20, 2017

(65) Prior Publication Data
US 2019/0122155 A1    Apr. 25, 2019

(51) Int. Cl.
*G06Q 10/06*    (2012.01)
*G06Q 10/10*    (2012.01)
(Continued)

(52) U.S. Cl.
CPC . *G06Q 10/06315* (2013.01); *G06Q 10/06311* (2013.01); *G06Q 10/06316* (2013.01);
(Continued)

(58) Field of Classification Search
None
See application file for complete search history.

(56) References Cited

U.S. PATENT DOCUMENTS

| 9,357,242 | B2 | 5/2016 | Sinha et al. |
| 9,870,508 | B1 * | 1/2018 | Hodgson ............... G11B 27/10 |

(Continued)

FOREIGN PATENT DOCUMENTS

| CN | 106843774 A | 6/2017 |
| CN | 107103405 A | 8/2017 |

(Continued)

OTHER PUBLICATIONS

Liu, An, et al. "Privacy-preserving task assignment in spatial crowdsourcing." (2017) (Year: 2017).*
(Continued)

*Primary Examiner* — Darlene Garcia-Guerra
(74) *Attorney, Agent, or Firm* — Anthony Curro

(57) ABSTRACT

A method, computer system, and a computer program product for blockchain enabled crowdsourcing is provided. The present invention may include receiving an asset from a content provider. The present invention may also include deploying a smart contract based on the received asset, wherein the deployed smart contract includes a plurality of compensation rules. The present invention then may include partitioning the received asset into a plurality of fragments based on the deployed smart contract. The present invention may further include releasing the partitioned plurality of fragments into a blockchain network. The present invention may also include tracking each fragment within the released plurality of fragments using the smart contract.

21 Claims, 6 Drawing Sheets

(51) Int. Cl.
  *G06Q 50/00* (2012.01)
  *H04L 9/34* (2006.01)
(52) U.S. Cl.
  CPC .......... *G06Q 10/101* (2013.01); *G06Q 50/01* (2013.01); *H04L 9/34* (2013.01); *G06Q 2220/00* (2013.01)

(56) References Cited

U.S. PATENT DOCUMENTS

| | | | | |
|---|---|---|---|---|
| 10,437,896 | B2* | 10/2019 | Soroushian | G06F 16/955 |
| 10,540,641 | B2* | 1/2020 | Chan | G06Q 40/08 |
| 2001/0025299 | A1* | 9/2001 | Chang | H04L 67/10 |
| | | | | 709/204 |
| 2005/0193005 | A1* | 9/2005 | Gates | G06F 16/489 |
| 2006/0059253 | A1* | 3/2006 | Goodman | G06Q 10/10 |
| | | | | 709/223 |
| 2006/0218651 | A1* | 9/2006 | Ginter | H04N 21/2543 |
| | | | | 726/27 |
| 2007/0241176 | A1* | 10/2007 | Epstein | H04N 1/448 |
| | | | | 235/375 |
| 2012/0069131 | A1* | 3/2012 | Abelow | G06Q 10/067 |
| | | | | 348/14.01 |
| 2012/0088220 | A1* | 4/2012 | Feng | G09B 7/00 |
| | | | | 434/362 |
| 2012/0265578 | A1* | 10/2012 | Olding | G06Q 10/06 |
| | | | | 705/7.25 |
| 2012/0316882 | A1* | 12/2012 | Fiumi | G10L 15/30 |
| | | | | 704/270 |
| 2013/0238410 | A1* | 9/2013 | Fargo | G06Q 30/0208 |
| | | | | 705/14.11 |
| 2014/0298409 | A1* | 10/2014 | Mock | G06F 21/60 |
| | | | | 726/1 |
| 2015/0089353 | A1* | 3/2015 | Folkening | G06F 16/958 |
| | | | | 715/234 |
| 2015/0112766 | A1* | 4/2015 | Barney | G06Q 30/0203 |
| | | | | 705/7.32 |
| 2015/0142643 | A1* | 5/2015 | Ceribelli | G06Q 30/04 |
| | | | | 705/39 |
| 2015/0254596 | A1 | 9/2015 | Nayar et al. | |
| 2016/0162478 | A1* | 6/2016 | Blassin | G06Q 10/063112 |
| | | | | 706/12 |
| 2016/0321769 | A1* | 11/2016 | McCoy | G06Q 30/0185 |
| 2016/0378549 | A1* | 12/2016 | Irish | H04L 67/1002 |
| | | | | 718/107 |
| 2017/0011460 | A1* | 1/2017 | Molinari | G06Q 40/04 |
| 2017/0019496 | A1* | 1/2017 | Orbach | H04L 67/306 |
| 2017/0041296 | A1* | 2/2017 | Ford | H04W 12/02 |
| 2017/0091467 | A1* | 3/2017 | Pogorelik | G06F 21/57 |
| 2017/0103472 | A1* | 4/2017 | Shah | H04L 9/32 |
| 2017/0116693 | A1* | 4/2017 | Rae | H04L 9/3236 |
| 2017/0180469 | A1* | 6/2017 | Ford | H04L 67/1008 |
| 2017/0220815 | A1* | 8/2017 | Ansari | G06Q 20/389 |
| 2017/0232300 | A1* | 8/2017 | Tran | G06F 3/017 |
| | | | | 434/247 |
| 2017/0236094 | A1* | 8/2017 | Shah | H04L 9/0637 |
| | | | | 705/300 |
| 2017/0272296 | A1* | 9/2017 | Manolakos | H04W 76/28 |
| 2018/0032611 | A1* | 2/2018 | Cameron | G06F 16/685 |
| 2018/0124437 | A1* | 5/2018 | Memisevic | H04N 21/854 |
| 2018/0183600 | A1* | 6/2018 | Davis | H04L 9/3239 |
| 2018/0189732 | A1* | 7/2018 | Kozloski | G06F 8/71 |
| 2018/0232643 | A1* | 8/2018 | Acharya | G06N 5/043 |
| 2018/0337695 | A1* | 11/2018 | Frankel | H04L 67/1097 |
| 2019/0081796 | A1* | 3/2019 | Chow | H04L 9/30 |
| 2019/0108140 | A1* | 4/2019 | Deshpande | H04L 9/3239 |

FOREIGN PATENT DOCUMENTS

| | | | |
|---|---|---|---|
| CN | 111133461 A | | 5/2020 |
| JP | 2002074052 A | | 3/2002 |
| JP | 2006048463 A | | 2/2006 |
| JP | 2008005323 A | | 1/2008 |
| JP | 2008165625 A | * | 7/2008 ............ G06Q 50/00 |
| JP | 2020537780 A | | 12/2020 |
| WO | 2016118655 A1 | | 7/2016 |
| WO | 2017145008 A1 | | 8/2017 |
| WO | 2019076624 A1 | | 4/2019 |

OTHER PUBLICATIONS

Byers, Simon, et al. "Analysis of security vulnerabilities in the movie production and distribution process." Proceedings of the 3rd ACM workshop on digital rights management. 2003 (Year: 2003).*

Li, Shuohao, et al. "Deep neural network with attention model for scene text recognition." IET Computer Vision 11.7 (2017): 605-612 (Year: 2017).*

Wang, Yingjie, et al. "An incentive mechanism with privacy protection in mobile crowdsourcing systems." Computer Networks 102 (2016): 157-171 (Year: 2016).*

JP 2008165625 A—Ura et al., Literary Work Management System, Jul. 17, 2008, pp. 1-34 (machine translation) (Year: 2008).*

Ming, et al., "CrowdBC: A Blockchain-based Decentralized Framework for Crowdsourcing", IACR, International Association for Cryptologic Research, vol. 20170929:030847, May 23, 2017, pp. 1-12.

International Search Authority, "Notification of Transmittal of the International Search Report and the Written Opinion of the International Searching Authority, or the Declaration," Patent Corporation Treaty, dated Nov. 30, 2018, 13 pages, International Application No. PCT/EP2018/076763.

Amara, "First Ever Crowd Subtitles App for YouTube Launched by Amara.org," Amara Blog, 2013, p. 1-2, https://about.amara.org/youtube-crowd-subtitles/, Accessed on Oct. 13, 2017.

Amazon, "Amazon Mechanical Turk—Welcome," Amazon Mechanical Turk Artificial Artificial Intelligence, p. 1, Amazon.com, Inc., https://www.mturk.com/mturk/welcome, Accessed on Oct. 13, 2017.

Ast et al., "The CrowdJury, a Crowdsourced Justice System for the Collaboration Era," CrowdJury White Paper, 2015, 12 Pages.

Baldassarri et al., "Assessment of a Tool for Users with Complex Communication Needs," Interaccion'14, Sep. 10-12, 2014, 2 Pages, ACM, Puerto de la Cruz, Tenerife, Spain.

Benshetler et al., "Web Site for Collaboration and Task Distribution in Video Caption Creation—C3," Dept. of CIS Senior Design, 2010, 8 Pages, University of Pennsylvania, Philadelphia, PA.

Bollier, "The Blockchain: A Promising New Infrastructure for Online Commons," David Bollier Blog, Mar. 4, 2015, p. 1-5, http://www.bollier.org/blog/blockchain-promising-new-infrastructure-online-commons, Accessed on Oct. 13, 2017.

Captionlabs, "Delivery," CaptionLabs Services, p. 1-6, Caption Labs, LLC., https://captionlabs.com/delivery/, Accessed on Oct. 13, 2017.

De Filippi, "What Blockchain Means for the Sharing Economy," Harvard Business Review, Mar. 15, 2017, p. 1-6, https://hbr.org/2017/03/what-blockchain-means-for-the-sharing-economy, Accessed on Oct. 13, 2017.

Frank et al., "Incentive-Based Crowdvoting Using a Blockchain," Application and Drawings, Filed on Dec. 26, 2016, 27 Pages, U.S. Appl. No. 15/390,594.

Hooker, "Crowdsourcing for Accessibility," DigitalGov, Dec. 29, 2014, p. 1-3, https://www.digitalgov.gov/2014/12/29/crowdsourcing-for-accessibility/, Accessed on Oct. 13, 2017.

Lorenzo, "E-books at the University of Salamanca: Management, Access, Visibility and User Perception," TEEM '14, Oct. 1-3, 2014, p. 541-546, ACM, Salamanca, Spain.

Mell et al., "The NIST Definition of Cloud Computing," National Institute of Standards and Technology, Sep. 2011, p. 1-3, Special Publication 800-145.

Olteanu et al., "Towards Robust and Scalable Peer-to-Peer Social Networks," SNS'12, Apr. 10, 2012, 6 Pages, ACM, Bern, Switzerland.

Pascual et al., "Impact of Web Accessibility Barriers on Users With Hearing Impairment," Interaccion'14, Sep. 10-12, 2014, 2 Pages, ACM, Puerto de la Cruz, Tenerife, Spain.

Seetharaman et al., "Audealize: Crowdsourced Audio Production Tools," JAES, Sep. 2016, p. 1-13, vol. 64, Issue 9.

(56) References Cited

OTHER PUBLICATIONS

Venkatesh et al., "Wikiaudia: Crowd-sourcing the Production of Audio and Digital Books," Proceedings of the International MultiConference of Engineers and Computer Scientists 2015 vol. I (IMECS 2015), Mar. 18-20, 2015, 6 Pages, Hong Kong.
Japan Patent Office, "Notice of Reasons for Refusal," dated May 26, 2022, 5 pages, JP Application No. 2020-519120.
Liu, et al, "Privacy-Preserving Task Assignment in Spatial Crowdsourcing," Journal of Computer Science and Technology 32: 905-918, 2017, 15 pgs., final publication available at https://link.springer.com/article/10.1007/s11390-017-1772-5.
Shen, et al., "Towards Preserving Worker Location Privacy in Spatial Crowdsourcing," 2015 IEEE Xplore, Downloaded on Apr. 7, 2022, 2015 IEEE Global Communications Conference (GLOBECOM), pp. 1-6, doi: 10.1109/GLOCOM.2015.7416965, <https://ieeexplore.ieee.org/abstract/document/7416965>.

* cited by examiner

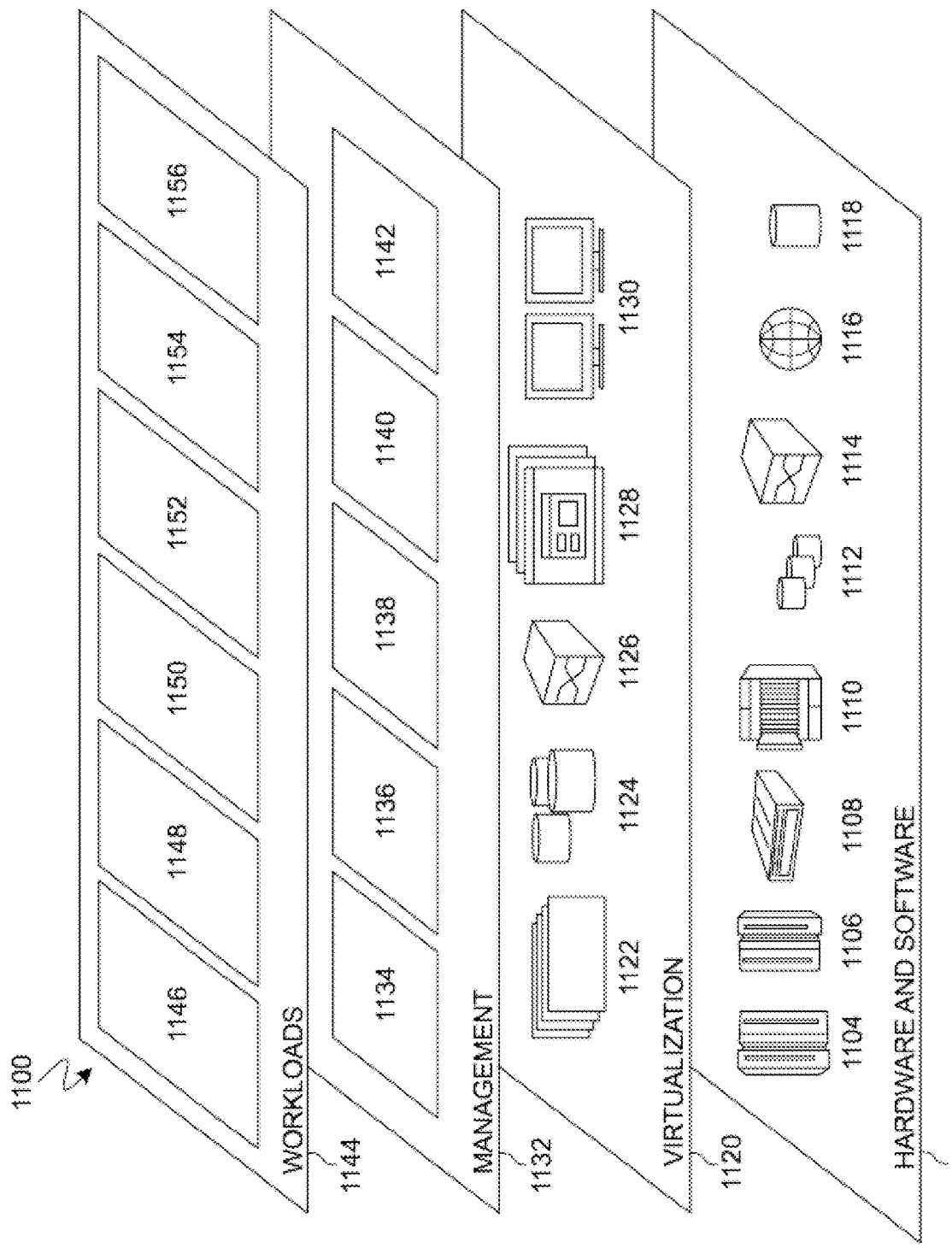

BLOCKCHAIN ENABLED CROWDSOURCING

BACKGROUND

The present invention relates generally to the field of computing, and more particularly to crowdsourcing.

The United States has provided protection for individuals with disabilities by enacting the 21$^{st}$ Century Communications and Video Accessibility Act (CVAA) through the Federal Communications Commission. The CVAA updated previous accessibility laws by ensuring newer technologies are accessible to individuals with disabilities. New technologies may include communications access and video programming through updated broadband services, digital innovation and mobile innovation. Audio and video closed captioning and scene descriptions may require a large amount of resources to fulfill the vast content required by the updated technology for the advanced communication services.

SUMMARY

Embodiments of the present invention disclose a method, computer system, and a computer program product for blockchain enabled crowdsourcing. The present invention may include receiving an asset from a content provider. The present invention may also include deploying a smart contract based on the received asset, wherein the deployed smart contract includes a plurality of compensation rules. The present invention then may include partitioning the received asset into a plurality of fragments based on the deployed smart contract. The present invention may further include releasing the partitioned plurality of fragments into a blockchain network. The present invention may also include tracking each fragment within the released plurality of fragments using the smart contract.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 6 is a block diagram of functional layers of the illustrative cloud computing environment of FIG. 5, in accordance with an embodiment of the present disclosure.

DETAILED DESCRIPTION

Figure 1:
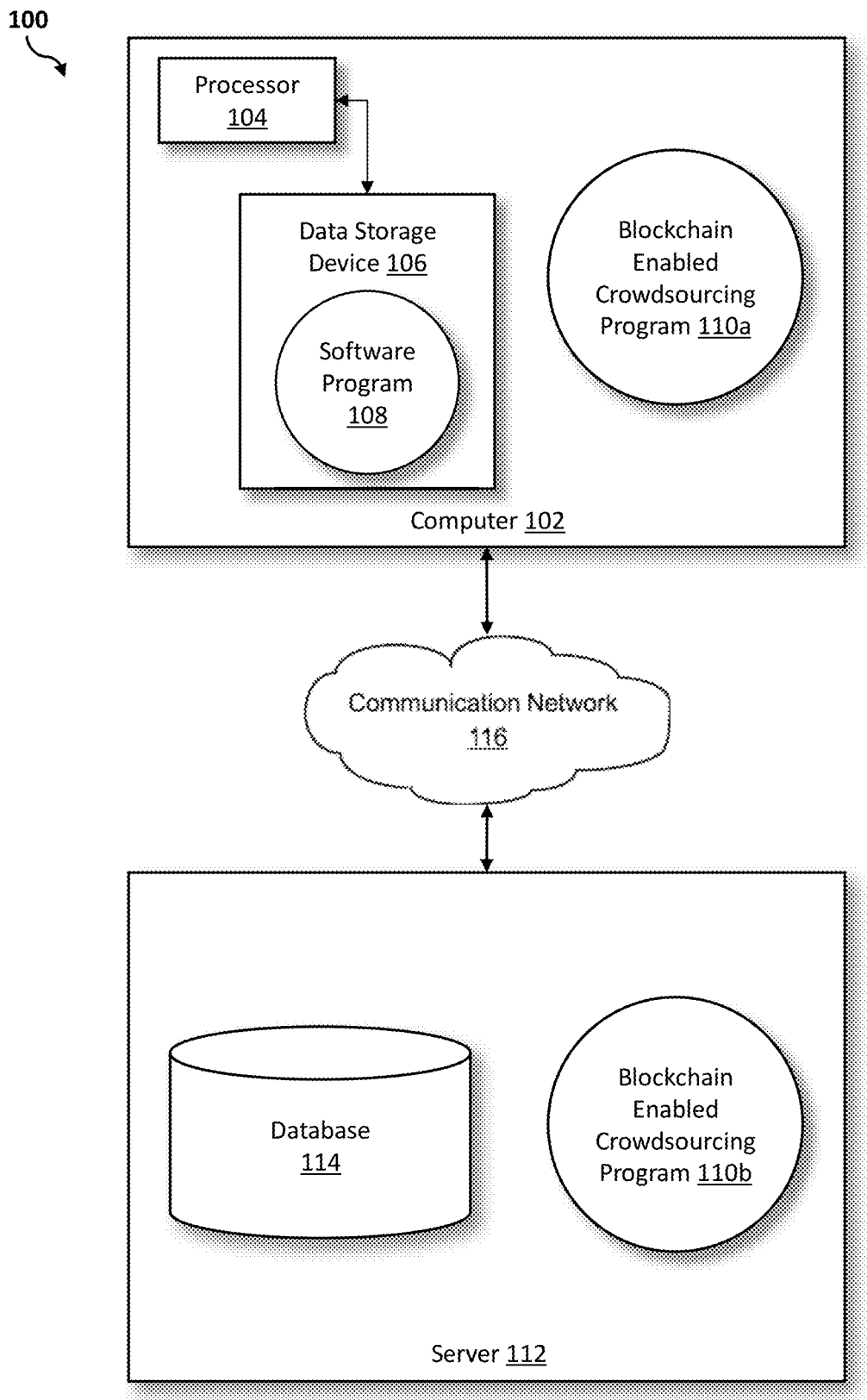
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for blockchain enabled crowdsourcing. As such, the present embodiment has the capacity to improve the technical field of crowdsourcing by generating audio and video closed captioning and video scene descriptions using blockchain enabled crowdsourcing. More specifically, content providers may allow volunteer participants, via crowdsourcing on a blockchained system environment, to create the work product to provide closed captioning and scene description information to the content providers in fragments to keep the full asset or script from becoming available to the public.

As previously described, the United States has provided protection for individuals with disabilities by enacting the 21$^{st}$ Century Communications and Video Accessibility Act (CVAA) through the Federal Communications Commission. The CVAA updated previous accessibility laws by ensuring newer technologies are accessible to individuals with disabilities. New technologies may include communications access and video programming through updated broadband services, digital innovation and mobile innovation. Audio and video closed captioning and scene descriptions may require a large amount of resources to fulfill the vast content required by the updated technology for the advanced communication services.

Expecting content providers to provide closed captioning and scene description support for each movie to enable access for an individual who may be impaired may not be realistic. Additionally, financial infeasibility may create a hardship for content providers or small studios to create the large amount of content required to update the communication services to impaired individuals. Therefore, it may be advantageous to, among other things, enable interested third-parties and individuals to create the additional material needed by utilizing decentralized blockchain technologies.

According to at least one embodiment, individuals may be enabled to create the additional material that may be needed to update the content to be aligned with the advanced communication services offered by content providers. An individual (e.g., advocate, volunteer, participant) or more than one individual (e.g., advocates, volunteers, participants) may operate as a third-party to provide supporting material to create a community based crowdsourcing model. Empowering individuals with the tools to create updated content may provide an effective solution. Crowdsourcing may allow interested individuals to donate or invest time to produce scene descriptions and closed captioning content. Volunteers may provide support to a particular community the volunteer is familiar with or a member of, such as committees or societies that may be specialized to meet the needs of that particular community.

Coordinating the participants and providing incentives for the contribution of a participant's work by using decentralized blockchain technologies may provide a solution without imposing an unrealistic demand of resources from the content providers. The blockchain enabled crowdsourcing program may incorporate decentralized blockchain technologies to empower communities to create scene descriptions, closed captions and other supportive material that may allow content providers to meet the commitment imposed by the recently enacted laws that require upgraded technologies for individuals with disabilities. Content providers may include entities such as small, mid-sized and large production studios, content generator websites, general web content contributors, lecturers, and academia.

Blockchain may be used to ensure accurate descriptions and compliance for the content provided by the participants. Blockchain may be leveraged to provide a trusted assessment (i.e., ranking) of the caption, the scene description, commentary or other material associated the project. The blockchain enabled crowdsourcing program may manage the work distribution to allow the community of participants to asynchronously submit work contributions. Scores for each participant's contribution may be created to allow participants to build a reputation based on the quality of work produced and uploaded. The reputation scores may also be incorporated to choose the best work product (e.g., caption, scene description or additional material). Captioning placement and where to position the overlay content may be determined by the content provider. The community of participants may also provide suggestions about where to position the overlay content on the screen related to the scene. Community suggestions may include, for example, placing the overlay content 2 inches from the bottom of the screen or to not place the overlay content in a particular part of the screen since that region is visually key to the scene.

Automated tools (e.g., language translation) and manual processing by human experts may be combined to provide solutions to work quality and to reach a large audience for the source and timing of the caption. Additionally, the blockchain enabled crowdsourcing program may be used to generate an audio version of a book. For example, a participant may provide the audio version of a book by uploading the audio file (e.g., wav or mp3 file) or a link to the audio file via a computing device with a microphone capable of transmitting data over a communication network. A participant may also provide, for example, the audio for a specific character in a book, story, poetry material or script and different versions of the audio may be submitted by the crowdsourcing community with different accents and languages, for example, a male or female narrator with an English accent.

The blockchain enabled crowdsourcing program may include a smart contract or multiple smart contracts. A smart contract may make available appropriate fragments of each asset to the user (e.g., participant) to bid on a caption. An asset may include a complete body of work, for example, a full script from the studio. Additionally, an asset may include protected or sensitive data. A fragment may be partitions or sections of the asset. When an asset is split into a large number of fragments, the complete body of work may be difficult to piece together by participants, which may keep the asset protected. Selecting the best work product (e.g., completed fragments) from a set of participants who have submitted a contribution may ensure more robust and reliable material. The selection process may be done in a task driven fashion that may reward participants who have volunteered time. Rewards may include, for example, free online movies, free tickets, or a points type reward system. Ranking the participants may provide a way for each participant to build a reputation and once the reputation reaches a certain level, or reaches a certain score, the participant may charge a fee (e.g., money or currency) for the participant's work product. Once the work product is available, the content provider may decide how to show the generated material (i.e., work product mapping between the generated material and frames) and may compose the best version of the work product, for example, the best version of the scene description for the movie or video. Additionally, alternate versions may be provided, for example, a version that requires parental approvals. The alternate versions may include embedding a natural language application into a smart contract.

The blockchain enabled crowdsourcing program may provide a method for content providers to distribute the assets to allow crowdsourcing community participants to supply work product to enable individuals with visual or hearing impairment to access, for example, scene descriptions, closed captions and other supportive material. The assets may be split into fragments that may be scrambled and protected by the blockchain network to protect ownership rights. Fragments in the blockchained network may be scrambled by combining different asset fragments. Assets may be split into workable fragments using cognitive or natural language techniques or may be done manually. Cognitive and natural language programs and processes may detect a speaker's change or a scene change. Cognitive and natural language programs and processes may include, for example, natural language processing (NLP). NLP may process structured and unstructured data into meaningful information. NLP may analyze a scene from, for example, a video clip or a movie, to find a meaningful or useful location to partition the asset into fragments. An NLP system may be created and trained by rules or machine learning and NLP processing may be executed on, for example, a computer or a server.

Content providers may release material on a case by case basis. Examples of the type of material content providers may release include audio tracks, timing information, raw video footage (i.e., incomplete video footage), scripts or storyboards. The content provider may use discretion as to what material will be released. The content provider may then deploy a smart contract with the required logic and permissions to coordinate the crowdsourcing work (i.e., project, asset, fragment). The smart contract may be invoked for each fragment of the original material to install each fragment in the blockchain. Each transaction may be unlinkable and may get shuffled with other transactions on the blockchain network. Each fragment may be included in a shuffled transaction and each participant may have a fragment available to work on. Transactions may include a fragment of original material deployed to a participant through a blockchained network and invoking a smart contract for the distributed material (i.e., asset broken into fragments for participants).

Each asset is broken into multiple fragments. The fragments may be scrambled. The larger the number of fragments that each asset is broken up into, the smaller the chances that multiple participants can collude to recreate the whole asset. For example, one whole asset is a script for a movie. If the script is broken up into 3 fragments, a participant working on 1 fragment may be able to speak to the two other participants working on the 2 other fragments and access the entire script. If the script is broken up into 1,000 fragments, the chances of the participants obtaining access to the entire script is much less likely.

Once fragments are distributed on the blockchain network, any participant may retrieve a fragment (i.e., transaction) to work on by invoking one function of the content provider's smart contract. The fragment retrieval process may require a certificate from the participant to keep track of the participant's access. Once the participant finishes creating the content (i.e., work product) for the fragment, the participant may upload or submit the content to the blockchain network, which may invoke another function of the content provider's smart contract. One other function of the smart contract may include uploading the content created for the fragment along with a user identifier (e.g., username) to associate the work with the participant who created the work for future reference (i.e., computing reputation scores). Each fragment may be processed by multiple participants without each participant's knowledge about another participant. Content providers may track the progress of the process at any moment by invoking another function from the smart contract that only the owner of the material may invoke. One other function of the smart contract may include tracking the progress of how many fragments are left to process to complete one asset.

Work product generated by the participants may need to be curated to compose the best version of the collected material. The curation process may also include crowdsourcing on a blockchain network or crowdvoting for real-time content curation using a blockchain. Once the curated version of the work product is created, a content provider may decide the best way to present the generated material with the final product (e.g., a movie or a television show). Content providers may use the best version of the collected material available and after a certain period of time, replace or update parts of the material with new segments that have been improved upon by the crowdsourcing community. The generated material may be applied to static content or dynamic content, for example, a caption or a scene description may be used for movies on physical media, streaming content, studio content or consumer content. A reputation score may then be generated for a participant or the multiple participants, for example, based on the number of contributions and feedback that was provided during the curation process. The computation for the score may be provided by the blockchain network through the system chaincode or may be tailored by a content provider and implemented in the smart contract associated with a particular asset.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a blockchain enabled crowdsourcing program 110a. The networked computer environment 100 may also include a server 112 that is enabled to run a blockchain enabled crowdsourcing program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the blockchain enabled crowdsourcing program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the blockchain enabled crowdsourcing program 110a, 110b (respectively) to generate audio and video closed captioning and video scene descriptions. The blockchain enabled crowdsourcing method is explained in more detail below with respect to FIGS. 2 and 3.

Figure 2:
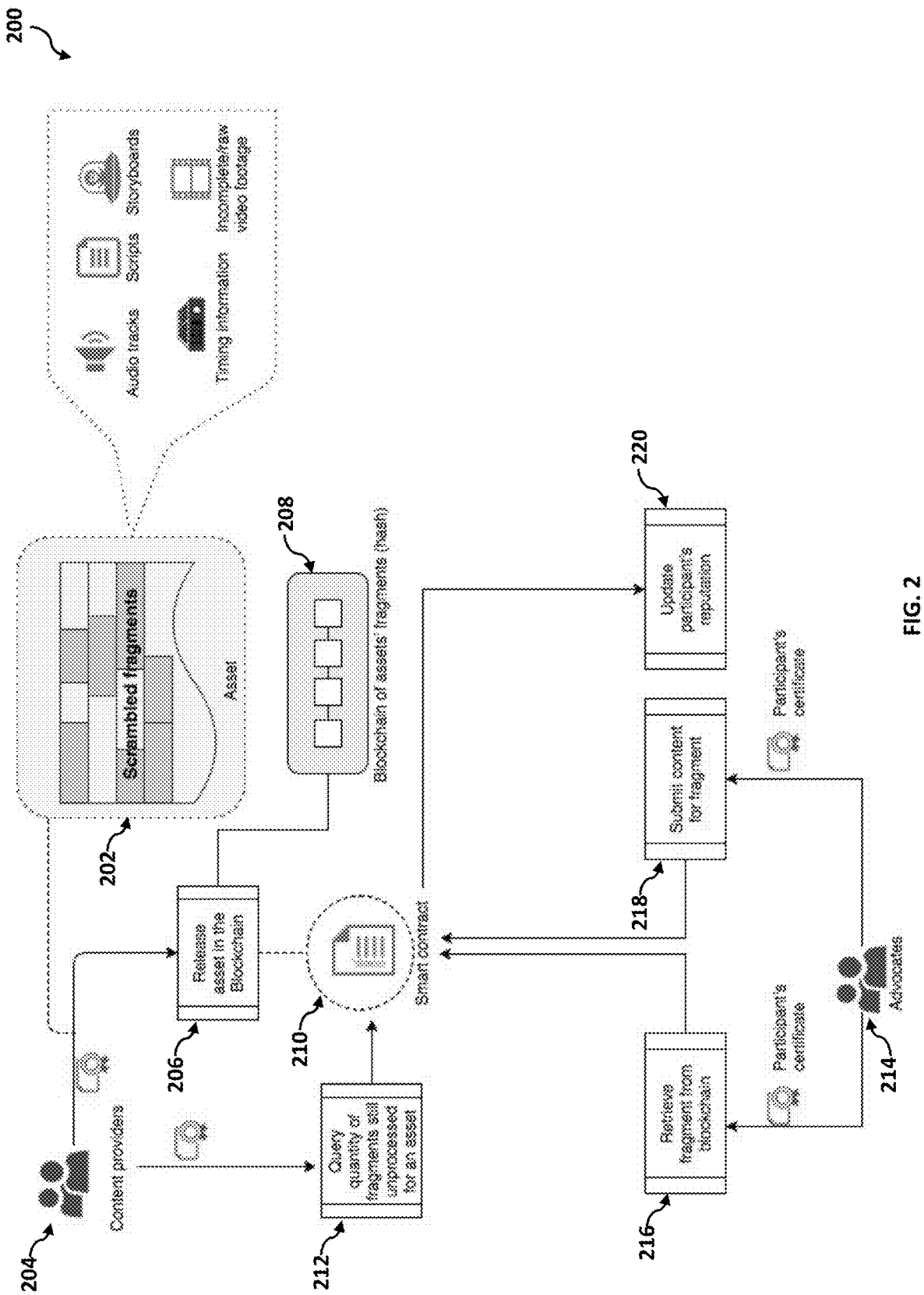
FIG. 2 is a block diagram of the blockchain enabled crowdsourcing system network according to at least one embodiment.

Referring now to FIG. 2, a block diagram illustrating a blockchain enabled crowdsourcing system network 200 according to at least one embodiment is depicted. The blockchain enabled crowdsourcing system network 200 may operate on computers (e.g., computer 102), servers (e.g., server 112), smart phones, tablets, or a device capable of sending and receiving IO operations and processing data. The devices may communicate and be connected via a communication network 116.

The asset 202 may be broken up into multiple fragments and the fragments may be scrambled. Assets 202 may be presented to the blockchain enabled crowdsourcing system network 200 by a content provider 204, for example, in the form of an audio track, a script, a storyboard, timing information or raw video footage (i.e., incomplete video footage). Examples of a content provider 204 may include studios, content generator websites, general web content contributors, lecturers, and academia. The content provider 204 may release an asset in the blockchain 206 (i.e., uploading an asset saved on a computer 102 into the blockchained enabled crowdsourcing system network 200 operating on a server 112 and using a communication network 116). The asset 202 may be scrambled fragments or unscrambled fragments. Fragments may be manually split up by a content provider 204 or the fragments may be split up using cognitive or natural language processing techniques.

Then the blockchain of asset fragments 208 may be hashed. Hashing the asset fragments 208 into a blockchain log may consist of a ledger of transactions or a log of asset fragments 208. Once a certain number of asset fragments 208 are received, the asset fragments 208 may be hashed using an algorithm that may turn a large amount of data into a fixed length hash. After the content provider 204 releases the asset 202 into the blockchain network at 206, the blockchain enabled crowdsourcing program 110a, 110b may require the asset 202 to be governed by a smart contract 210. The smart contract 210 may make appropriate fragments of the asset 202 available to participants. A content provider 204 may also use a smart contract 210 to query the quantity of the unprocessed asset fragments 212 (i.e., the content provider 204 can check to see how many asset fragments 208 are finished and how many more asset fragments 208 are needed to complete the project or asset 202). Unprocessed asset fragments 212 may be, for example, the number of asset fragments 208 outstanding before the project is finished.

Advocates 214 may be participants who are donating time towards completing a fragment of an asset 202. An advocate 214 may either retrieve a fragment from the blockchain network 216 or submit fragment content 218 to the blockchain network through the smart contract 210 associated with the fragment. The smart contract 210 parameters may be created by the content provider 204 and the smart contract 210 may also update the participant's reputation 220. Participants may be ranked or scored to create a reputation. Smart contract 210 parameters may include the number of fragments to create for an asset 202, the reputation score reward for each processed fragment, additional rewards, if any, for each fragment, and the period of time the fragments will be available for advocates to process the fragments. The process for ranking and scoring may include collecting the reputation score rewards for each processed fragment plus any additional reward, such as the completion of work in a given time frame or submitting a high volume of completed fragments.

Figure 3:
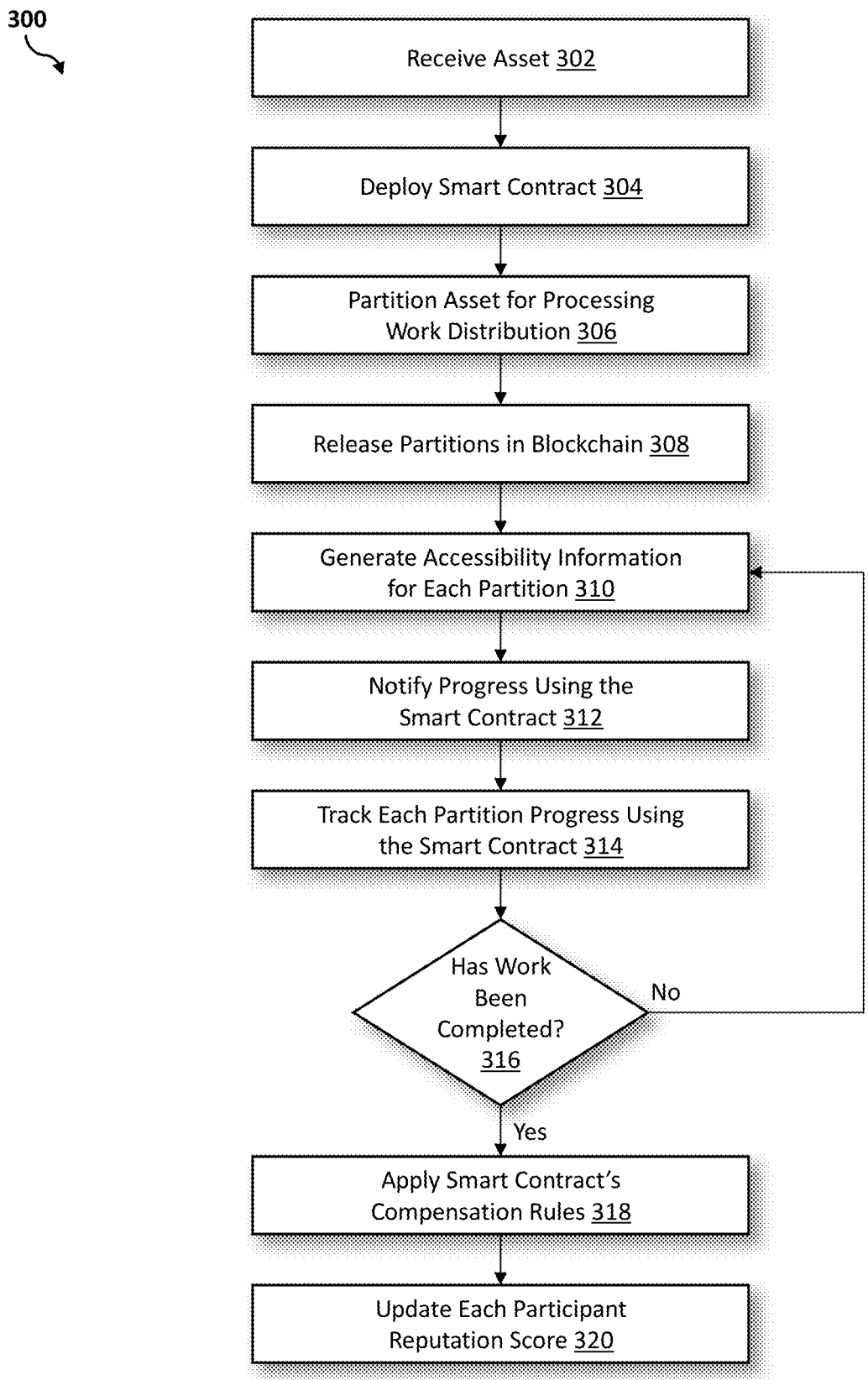
FIG. 3 is an operational flowchart illustrating a process for blockchain enabled crowdsourcing according to at least one embodiment.

Referring now to FIG. 3, an operational flowchart illustrating the exemplary blockchain enabled crowdsourcing process 300 used by the blockchain enabled crowdsourcing program 110a, 110b according to at least one embodiment is depicted.

At 302, an asset 202 is received. The content provider 204 may produce and provide an asset 202 to the blockchain enabled crowdsourcing system network 200. For example, the content provider 204 uploads the asset 202 using a computer 102 where the asset 202 is saved on the computer data storage device 106 and the asset 202 is processed through the blockchain enabled crowdsourcing program 110a, 110b on a computer or a server 112. An asset 202 may be material used to create closed captioning information, for example, a movie, a script or raw video footage. The material or asset 202 released by the content provider 204 into the blockchain enabled crowdsourcing system network 200 may be audio tracks, timing information, raw video footage, scripts or storyboards. The content provider 204 may release assets 202 at the studio's discretion and the content provider 204 may choose the type of material to be released on a case by case basis. The released asset 202 may enable a crowdsourcing community to create scene descriptions for closed captions and other supportive material to enable access for a hearing impaired or visually impaired individual.

Next, at 304, a smart contract 210 is deployed. A content provider 204 may deploy a smart contract 210 with particular permissions associated with the crowdsourcing work (i.e., asset 202). The permissions set by the content provider 204 may include work rules, compensation rules, special privileges and tracking the progress of an asset 202. A smart contract 210 may be invoked for each fragment of the asset 202 (i.e., original material) to be installed or uploaded into the blockchained enabled crowdsourcing network 200. An example of a work rule may include a parental approval version requirement instructing that the content avoids specific words, recommends which specific words should be not be translated or recommends how to describe the avoided word in a scene. One other work rule may include an assignment of varying importance for each fragment. For example, the most important scenes can only be processed by a subject matter expert (SME), a professional person doing closed captioning or an advocate with a high reputation score (i.e., higher than a certain value or threshold value). An additional rule may include a content provider 204 specifying a limit on the number of characters to display in a specific segment. The character limit may be specified manually by the content provider 204 or may be automatically generated using a machine learning (ML) approach. For example, the ML approach can learn from all of the received fragments over time and is able compute an estimate of the average closed caption length for similar scenes. One other rule may include deciding which fragments may have higher and lower importance, for example, some fragments may be important to a scene and may not be left out and others may not be necessary if a deadline is approaching, thus the fragments that are available to an asset 202 may be used and the less important fragments may be added as they get uploaded by a participant.

A compensation rule, for example, may include reputation score rewards, additional rewards if the fragment is completed in a given time period, codes (e.g., points, tokens or discounts) for accessing exclusive online content, or codes for redeeming movie tickets or other rewards. Special privileges and tracking asset 202 progress may include allowing the content provider 204 to inquire about the status of an asset 202 to know how many fragments are outstanding before the asset 202 work product is complete.

One smart contract 210 may include permissions associated with submitting asset fragments 208 to the blockchained network by a content provider 204 (i.e., content owner). An example of the smart contract 210 pseudo code for a content provider 204 to submit or upload asset fragments 208 is shown below.

```
function submit_fragment(fragment, ownershipPubkey, ownershipSignature) {
    if (!verifySignature(hash(fragment), ownershipPubkey, ownershipSignature) {
        return error;
    }
    var fragmentID = hash(fragment);
    ledgerState.put(fragmentID ,fragment);
    var ownerKey = hash(ownershipPubkey);
    var ownerFragments = ledgerState.get(ownerKey);
    ownerFragments.add(fragmentID);
    ledgerState.put(ownerKey, ownerFragments);
    return fragmentID;
}
```

One other smart contract 210 may include permissions associated with requesting, for example, by a participant (e.g., advocate 214), a fragment to work on. An example of the smart contract 210 pseudo code for a participant to request a fragment to work on is shown below.

```
function get_fragment(userCert, fragmentID) {
    if (!verifyUserCertificate(userCert, fragmentID)) {
        return error;
    }
    return ledgerState.get(feedbackID);
}
```

Where verifyUserCertificate may verify that a certificate is signed by a valid Certificate Authority (CA), may verify that fragmentID is on the CA's authorized fragments, and may verify that fragmentID is on the user certificate (userCert). A CA may certify, digitally, the ownership of a public or private key (e.g., hypertext transfer protocol secure (HTTPS) or secure sockets layer (SSL) server certificates).

One other smart contract 210 may include permissions associated with submitting a contribution of work product for a fragment. An example of the smart contract 210 pseudo code for a participant to submit a work product fragment back into the blockchain enabled crowdsourcing system network 200 is shown below.

```
function submit_contribution(userCertificate, fragmentID,
  encryptedContribution) {
    if (!verifyUserCertificate(userCert, fragmentID)) {
      return error;
    }
    var contributionsKey = fragmentID + "_contributions";
    var contributions = ledgerState.get(contributionsKey);
    contributions.add(encryptedContribution);
    ledgerState.put(contributionsKey, contributions);
}
```

One other smart contract 210 may include permissions associated with obtaining a contribution of work product for a fragment. An example of the smart contract 210 pseudo code for a content provider 204 to receive a participant's contribution of a fragment work product is shown below.

```
function get_contributions(fragmentID, ownerPubkey,
  ownershipSignature) {
    var ownerKey = hash(ownershipPubkey);
    var ownerFragments = ledgerState.get(ownerKey);
    for (id: ownerFragments) {
      if (id == fragmentID) {
        var contributionsKey = fragmentID + "_contributions";
        return ledgerState.get(contributionsKey);
      }
    }
    return error;
}
```

One other smart contract 210 may include permissions associated with an optional smart contract 210 to create a CA. An example of the smart contract 210 pseudo code for permission to create a CA is shown below.

```
function create_ca(caPubkey, fragmentList, ownershipPubkey,
ownershipSignature) {
  if (!verifySignature(hash(caPubkey+fragmentList), ownershipPubkey,
  ownershipSignature) {
    return error;
  }
  var ownerKey = hash(ownershipPubkey);
  var ownerFragments = ledgerState.get(ownerKey);
  for (fragmentID : fragment_list) {
    if (!validFragment(fragmentID, ownerFragments) {
      return error;
    }
  }
  var caKey = hash(caPubkey);
  ledgerState.put(caKey, fragmentList);
  return;
}
```

Using a CA may be beneficial since a CA may be responsible for the creation of user certificates in complex scenarios. However, using a CA may not be required in the blockchain enabled crowdsourcing system network 200. For example, a CA may assign tasks to its members by creating certificates with different fragment identifications for each user. Also, a CA may have a face to face interaction with its members in order to authorize the member to contribute work product to a project.

Then at 306, the asset 202 is partitioned and the work distribution is processed. The transaction of associating a smart contract 210 with a fragment may be unlinkable and may be shuffled with other transactions on the blockchain network. A released asset 202 may consist of scrambled fragments or unscrambled fragments. The asset 202 released by the content provider 204 may be split up or partitioned into fragments. The number of fragments may be decided by the content provider 204. The more fragments created from an asset 202, the better the chance that participants will not be able to piece together the asset 202 by colluding with other participants. Splitting the fragments may be done manually or may be done using cognitive or natural language processing techniques. Cognitive and natural language processing techniques may, for example, detect a speaker's change in voice or a scene's change in a movie.

Next at 308, the asset partitions (i.e., fragments) are released in the blockchain. The blockchain enabled crowdsourcing program 110a, 110b may send the partitioned assets (i.e., fragments) to be hashed by the blockchain of asset fragments 208. The released fragments may be associated with the smart contract's 210 particular permissions provided at 304. The blockchain may log and hash the fragments, the associated smart contract 210 and permissions to create an immutable account of the data entered into the blockchained enabled crowdsourcing system network 200.

For example, 10,000 fragments for the storyboard (i.e., asset 202) of a new animation movie are generated and released. The required work is to generate scene descriptions based on the storyboard. The storyboard information may be fragmented manually, by the content provider 204, or using an automated process such as NLP. Each fragment would then be hashed and scrambled with other asset fragments 208 released into the blockchain network.

At 310, accessibility information is generated for each partition or fragment. The accessibility information may be associated with the crowdsourcing community. Crowdsourcing for accessibility may utilize the Web Content Accessibility Guidelines (WCAG) standards. Required access permissions may be applied to each fragment to control which participants may be allowed access to the fragments. If no access permissions are required, then every participant may be able to retrieve fragments to work on. An accessibility example may include a platform where a user may request a task to be performed by an individual or a human and the individual would receive a micro payment for the services rendered. Generating accessibility information may make the fragment accessible for a participant to access, via a smart contract 210, and complete.

Accessibility information may also be generated for a fragment that had been previously released and not completed by a participant. For example, if a participant A had received a fragment to complete, however, participant A did not complete the fragment within the specified time, the fragment may become accessible for participant B to work on and complete. Also, one fragment, for example, may be completed by more than one participant so accessibility may be provided to more than one participant at the same time.

Then at 312, progress is sent by a notification, using a smart contract 210. A content provider 204 may be notified of the progress of an asset's 202 work product using the smart contract 210. By inquiring through the smart contract 210 permissions, the content provider 204 may obtain notification information, for example, on a computer or server 112, regarding how many fragments of a particular asset 202 are outstanding before the asset 202 work product is complete.

Next at 314, each fragment's progress is tracked using the smart contract 210. As each participant finishes and uploads the fragment work product back into the blockchain enabled crowdsourcing system network 200, the progress is tracked. For example, a participant using a computer 102 uploads the completed fragment, via a communication network 116, and this submission of work is tracked by the smart contract 210. The smart contract 210 may track, for example, how many fragments of an asset 202 have been received or uploaded by the participant and how many fragments are outstanding for a particular asset 202 to be complete.

Then, at 316, the blockchain enabled crowdsourcing program 110a, 110b determines if the work has been completed. According to at least one embodiment, the blockchain enabled crowdsourcing program 110a, 110b may determine that work may be complete when a participant submits the completed work fragment (e.g., upload the completed fragment via computer 102) to the blockchain enabled crowdsourcing system network 200 and the content provider 204 is then notified (e.g., on a computing device by an alert) via the smart contract 210. Once there is a predetermined number, amount or percentage of notifications for an asset 202, the content provider 204 may determine the work is complete. The predetermined amount of notifications may depend on the context of a particular asset 202.

For example, if there are 1,000 fragments, 1 notification for each unique fragment (i.e., 1,000 notifications) may be sufficient to determine the work of the fragment is complete, however, each complete notification may not ensure the quality of work produced. One other way to determine completed work may include the content provider 204 requiring a predetermined number of notifications with a specified level of quality before determining the work is complete. For each notification via the smart contract 210, the content produced by the advocates may be analyzed, manually or automatically (e.g., manually by a content provider 204 or automatically by NLP), to determine the quality of the work product and the completed fragment may be accepted or rejected by the content provider 204. For example, if there are 1,000 fragments that require a predetermined level of quality before being considered complete, the work or asset 202 is not considered complete until all 1,000 fragments that are returned by the participants meet the predetermined level of quality.

An alternate embodiment may allow a participant to submit the work product for one or more fragments and each fragment may be recorded into the ledger and can be queried later by the content provider 204. The number of fragments that a participant may submit at one time may vary.

If the blockchain enabled crowdsourcing program 110a, 110b determined that the work has not been completed at 316, the blockchain enabled crowdsourcing program 110a, 110b will return to generate accessibility information for each partition or fragment at 310.

If the blockchain enabled crowdsourcing program 110a, 110b determined that the work has been completed at 316, the blockchain enabled crowdsourcing program 110a, 110b will apply the smart contract's 210 compensation rules at 318. Compensation rules may allow the participants to be rewarded by the time volunteered to work on a fragment. Rewards may include, for example, free online movies, free tickets, or a points type reward system. Once a participant has built a positive reputation, the participant may be rewarded by money or currency.

Triggering the execution of the compensation rules may use a pull model or a push model. A pull model may allow information to be requested from a server 112 and a push model may transmit information to a device without an explicit request. The decision to execute the compensation rules may be done at specific time intervals or may be triggered by an event (e.g., work completed and uploaded by a participant). For example, the work may have been completed and submitted with acceptable quality by a participant, however, the participant may not be compensated until a later time based on the business agreement between the participant and the content provider 204. A smart contract 210 may also periodically query the information in the ledger to determine the list of participants that have completed the work, notify the content providers 204 and trigger the compensation rules to reward or pay the participants. Providing compensation at certain intervals of time may be efficient in some scenarios, for example, when an asset 202 is split into a large number of fragments.

Then at 320, each participant's reputation score is updated or assigned. Scores for each participant's contribution may be created to allow participants to build a reputation based on the quality of work produced and uploaded. The reputation scores may also be incorporated to choose the best participant work product, such as caption, scene description or additional material. The higher the reputation score, the more weight may be associated with a quality work product. Ranking a participant may also be associated with a participant's score. For example, if the same fragment was created by multiple participants, the participant score and ranking may provide the best version of the scene description for the movie or video. Additionally, alternate versions may be provided, for example, a version that requires parental approvals. The alternate versions may include embedding a natural language application into a smart contract 210.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
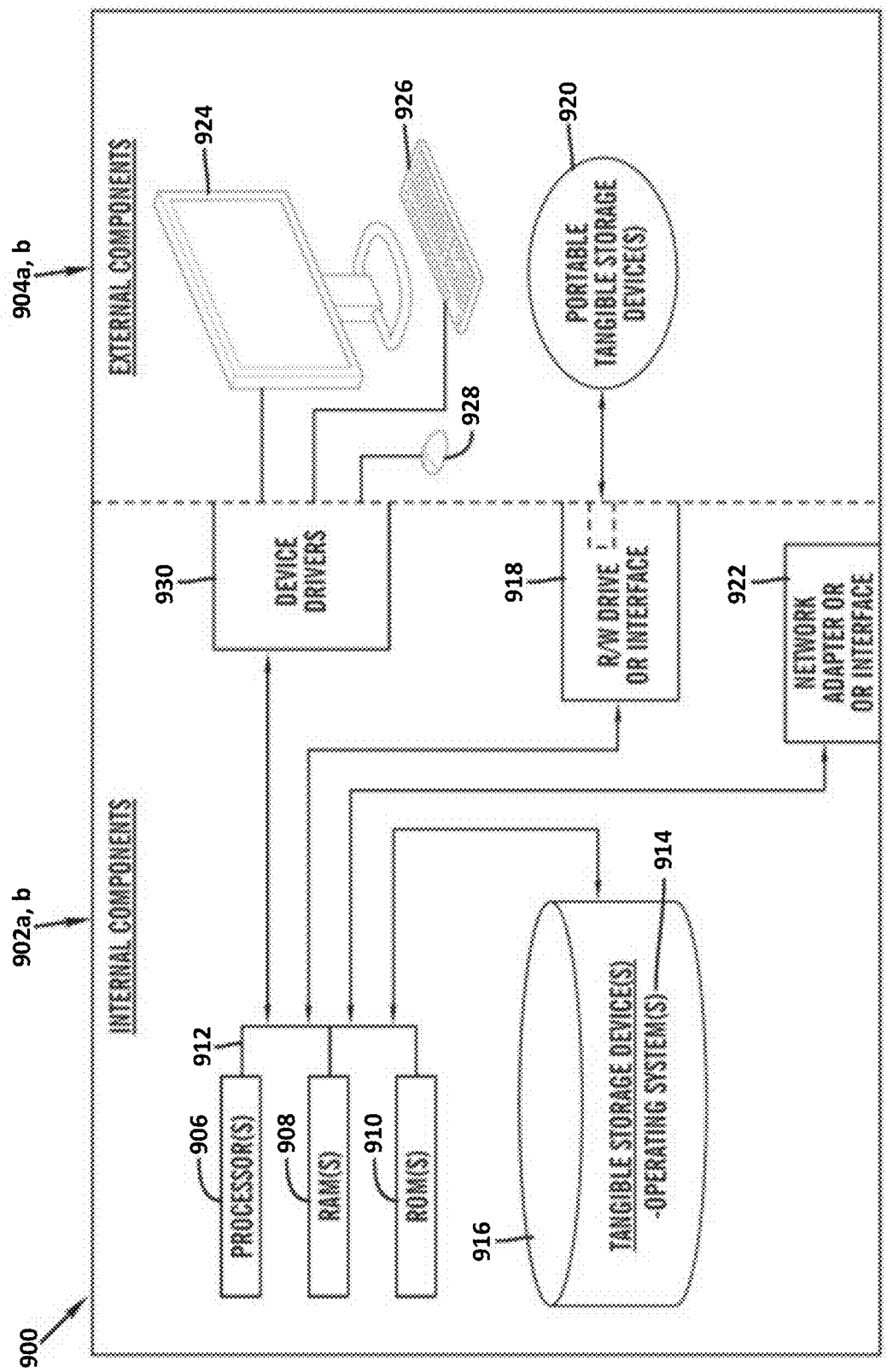
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 1002 and network server 112 may include respective sets of internal components 902a,b and external components 904a,b illustrated in FIG. 4. Each of the sets of internal components 902a,b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the blockchain enabled crowdsourcing program 110a in client computer 102, and the blockchain enabled crowdsourcing program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a,b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the blockchain enabled crowdsourcing program 110a, 110b can be stored on one or more of the respective portable computer-readable tangible storage devices 920, read via the respective R/W drive or interface 918 and loaded into the respective hard drive 916.

Each set of internal components 902a,b may also include network adapters (or switch port cards) or interfaces 922 such as a TCP/IP adapter cards, wireless wi-fi interface cards, or 3G or 4G wireless interface cards or other wired or wireless communication links. The software program 108 and the blockchain enabled crowdsourcing program 110a in client computer 102 and the blockchain enabled crowdsourcing program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the blockchain enabled crowdsourcing program 110a in client computer 102 and the blockchain enabled crowdsourcing program 110b in network server computer 112 are loaded into the respective hard drive 916. The network may comprise copper wires, optical fibers, wireless transmission, routers, firewalls, switches, gateway computers and/or edge servers.

Each of the sets of external components 904a,b can include a computer display monitor 924, a keyboard 926, and a computer mouse 928. External components 904a,b can also include touch screens, virtual keyboards, touch pads, pointing devices, and other human interface devices. Each of the sets of internal components 902a,b also includes device drivers 930 to interface to computer display monitor 924, keyboard 926, and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
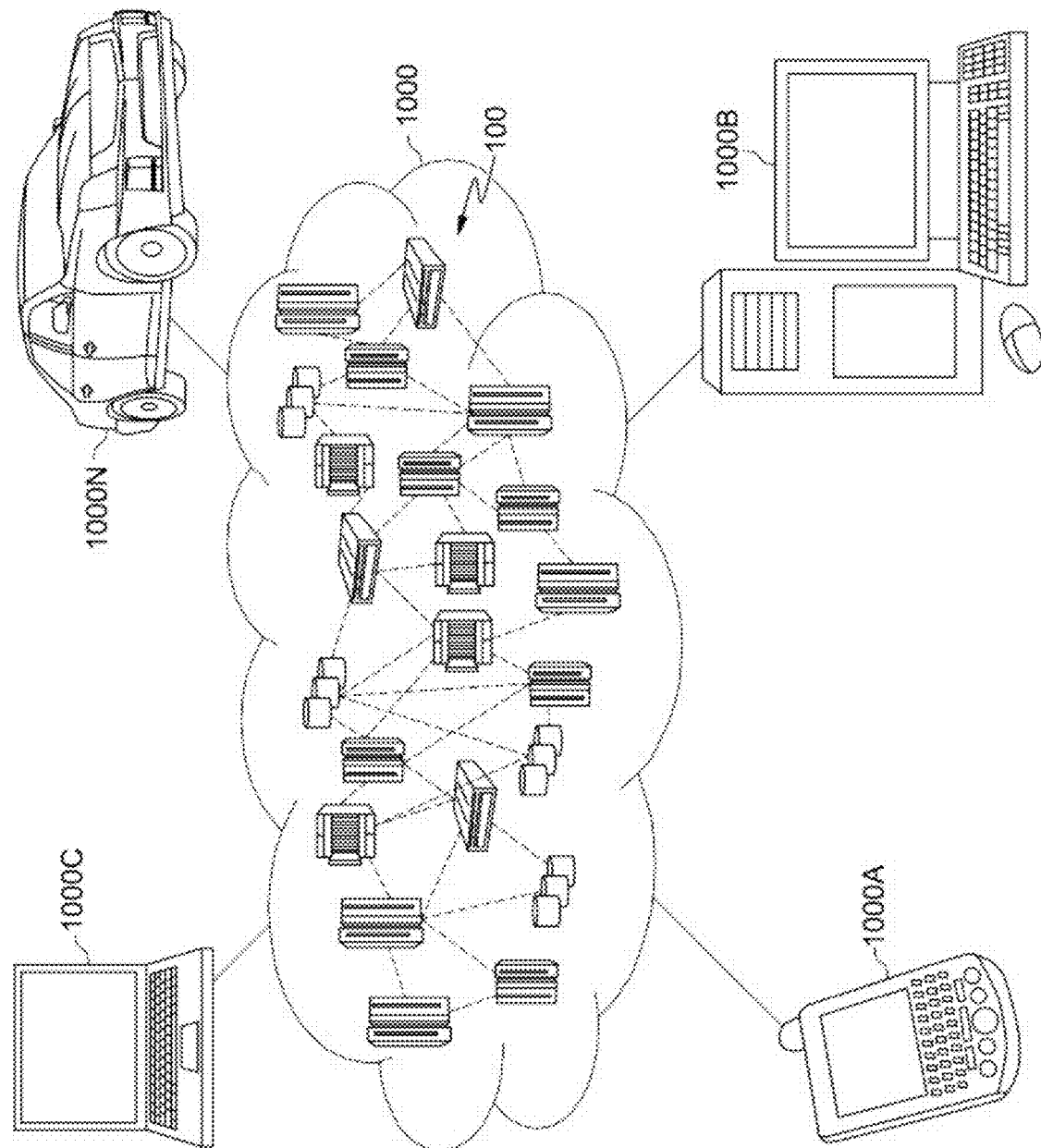
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and blockchain enabled crowdsourcing 1156. A blockchain enabled crowdsourcing program 110a, 110b provides a way to generate audio and video closed captioning and video scene descriptions using blockchain enabled crowdsourcing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for blockchain enabled crowdsourcing, the method comprising:
    receiving an asset from a content provider;
    deploying a smart contract with permissions associated with the asset;
    partitioning the asset into a plurality of asset fragments using cognitive or natural language techniques, wherein partitioning the asset includes processing structured and unstructured data to find a location to partition the asset into the plurality of asset fragments;
    scrambling the plurality of asset fragments, wherein the partitioning and the scrambling protect the asset by unlinking the plurality of asset fragments and protect ownership rights of the asset;
    logging and hashing each of the asset fragments into a blockchain log associated with a ledger of transactions or a log of asset fragments;
    releasing each of the logged and hashed asset fragments into a blockchain network associated with the blockchain log;

generating a plurality of access permissions for each logged and hashed asset fragment in the blockchain network, wherein one of the plurality of access permissions includes allowing multiple participants to access and complete a same logged and hashed asset fragment at a same time;

tracking each of the logged and hashed asset fragments in the blockchain network;

receiving a request from a participant of a plurality of participants to access one or more logged and hashed access fragments;

invoking the smart contract to retrieve the one or more logged and hashed access fragments; and receiving multiple versions of the logged and hashed asset fragments as a completed work product through the blockchain network, the completed work product including work contributions from the plurality of participants, each work contribution submitted asynchronously by each of the participants and without knowledge of work contributions submitted by other participants associated with the same logged and hashed asset fragment.

2. The method of claim 1, further comprising: notifying the content provider of a progress associated with each released logged and hashed asset fragment released into the blockchain network.

3. The method of claim 1, further comprising:
determining that a released asset fragment has been completed by a participant;
applying compensation rules and asset progress tracking based on the determined completed asset fragment; and
creating a participant reputation score based on the determined completed asset fragment.

4. The method of claim 1, further comprising:
determining that a released asset fragment has not been completed by a participant within a deadline; and
triggering an action to obtain the determined asset fragment that has not been completed, wherein the action is either hiring a professional to complete the determined asset fragment or increasing a compensation reward for a crowdsourcing community to complete the determined asset fragment.

5. The method of claim 1, wherein the participants that work on a plurality of separate asset fragments are a part of a crowdsourced network.

6. The method of claim 1, wherein the partitioned plurality of asset fragments is processed using cognitive or natural language techniques.

7. The method of claim 6, wherein the cognitive or natural language techniques detect a change in speaker voice or a scene change in a movie.

8. The method of claim 1, further comprising after receiving the completed work product, curating the completed work product using the blockchain network to obtain a best version of the completed work product.

9. The method of claim 8, wherein curating the completed work product includes crowdsourcing content on the blockchain network or crowdvoting for real-time content creation on the blockchain network.

10. The method of claim 1, further comprising receiving a query from the content provider regarding how many asset fragments are outstanding before a work product is complete.

11. The method of claim 1, wherein each asset fragment is associated with a fixed length hash.

12. A computer system for blockchain enabled crowdsourcing, comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system performs a method comprising:
receiving an asset from a content provider;
deploying a smart contract with permissions associated with the asset;
partitioning the asset into a plurality of asset fragments using cognitive or natural language techniques, wherein partitioning the asset includes processing structured and unstructured data to find a location to partition the asset into the plurality of asset fragments;
scrambling the plurality of asset fragments, wherein the partitioning and the scrambling protect the asset by unlinking the plurality of asset fragments and protect ownership rights of the asset;
logging and hashing each of the asset fragments into a blockchain log associated with a ledger of transactions or a log of asset fragments;
releasing each of the logged and hashed asset fragments into a blockchain network associated with the blockchain log;
generating a plurality of access permissions for each logged and hashed asset fragment in the blockchain network, wherein one of the plurality of access permissions includes allowing multiple participants to access and complete a same logged and hashed asset fragment at a same time;
tracking each of the logged and hashed asset fragments in the blockchain network;
receiving a request from a participant of a plurality of participants to access one or more logged and hashed access fragments;
invoking the smart contract to retrieve the one or more logged and hashed access fragments; and
receiving multiple versions of the logged and hashed asset fragments as a completed work product through the blockchain network, the completed work product including work contributions from the plurality of participants, each work contribution submitted asynchronously by each of the participants and without knowledge of work contributions submitted by other participants associated with the same logged and hashed asset fragment.

13. The computer system of claim 12, further comprising: notifying the content provider of a progress associated with each released logged and hashed asset fragment released into the blockchain network.

14. The computer system of claim 12, further comprising:
determining that a released asset fragment has been completed by a participant;
applying compensation rules and asset progress tracking based on the determined completed asset fragment; and
creating a participant reputation score based on the determined completed asset fragment.

15. The computer system of claim 12, further comprising:
determining that a released asset fragment has not been completed by a participant;
and
notifying the content provider of a progress associated with each released asset fragment.

16. The computer system of claim 12, further comprising:
   determining that a released asset fragment has not been completed by a participant within a deadline; and
   triggering an action to obtain the determined asset fragment that has not been completed, wherein the action is either hiring a professional to complete the determined asset fragment or increasing a compensation reward for a crowdsourcing community to complete the determined asset fragment.

17. The computer system of claim 12, wherein the participants that work on a plurality of separate asset fragments are a part of a crowdsourced network.

18. A computer program product for blockchain enabled crowdsourcing, comprising:
   one or more computer-readable tangible storage media and program instructions stored on at least one of the one or more computer-readable tangible storage media, the program instructions executable by a processor to cause the processor to perform a method comprising:
   receiving an asset from a content provider;
   deploying a smart contract with permissions associated with the asset;
   partitioning the asset into a plurality of asset fragments using cognitive or natural language techniques, wherein partitioning the asset includes processing structured and unstructured data to find a location to partition the asset into the plurality of asset fragments;
   scrambling the plurality of asset fragments, wherein the partitioning and the scrambling protect the asset by unlinking the plurality of asset fragments and protect ownership rights of the asset;
   logging and hashing each of the asset fragments into a blockchain log associated with a ledger of transactions or a log of asset fragments;
   releasing each of the logged and hashed asset fragments into a blockchain network associated with the blockchain log;
   generating a plurality of access permissions for each logged and hashed asset fragment in the blockchain network, wherein one of the plurality of access permissions includes allowing multiple participants to access and complete a same logged and hashed asset fragment at a same time;
   tracking each of the logged and hashed asset fragments in the blockchain;
   receiving a request from a participant of a plurality of participants to access one or more logged and hashed access fragments;
   invoking the smart contract to retrieve the one or more logged and hashed access fragments; and
   receiving multiple versions of the logged and hashed asset fragments as a completed work product through the blockchain network, the completed work product including work contributions from the plurality of participants, each work contribution submitted asynchronously by each of the participants and without knowledge of work contributions submitted by other participants associated with the same logged and hashed asset fragment.

19. The computer program product of claim 18, further comprising:
   notifying the content provider of a progress associated with each released logged and hashed asset fragment released into the blockchain network.

20. The computer program product of claim 18, further comprising:
   determining that a released asset fragment has been completed by a participant;
   applying compensation rules and asset progress tracking based on the determined completed asset fragment; and
   creating a participant reputation score based on the determined completed asset fragment.

21. The computer program product of claim 18, further comprising:
   determining that a released asset fragment has not been completed by a participant;
   and
   notifying the content provider of a progress associated with each released asset fragment.

* * * * *